Feb. 1, 1944.    P. F. SCOFIELD    2,340,620
SECURING MEANS
Filed Dec. 17, 1942

INVENTOR.
PHILIP F. SCOFIELD
BY
Frank H. Harmon
ATTORNEY

Patented Feb. 1, 1944

2,340,620

UNITED STATES PATENT OFFICE 2,340,620

SECURING MEANS

Philip F. Scofield, Cleveland Heights, Ohio, assignor to Jack & Heintz, Inc., Bedford, Ohio, a corporation of Ohio Application December 17, 1942, Serial No. 469,340

3 Claims. (Cl. 189—36)

The present invention relates to novel and improved securing means for fastening parts together, and for securing accessory devices on engine mounting pads and the like.

The object of the invention is to provide improved means for securing a housing to stud bolts or the like on a supporting structure.

The invention is best understood with reference to the accompanying drawing in which.

Figure 1:
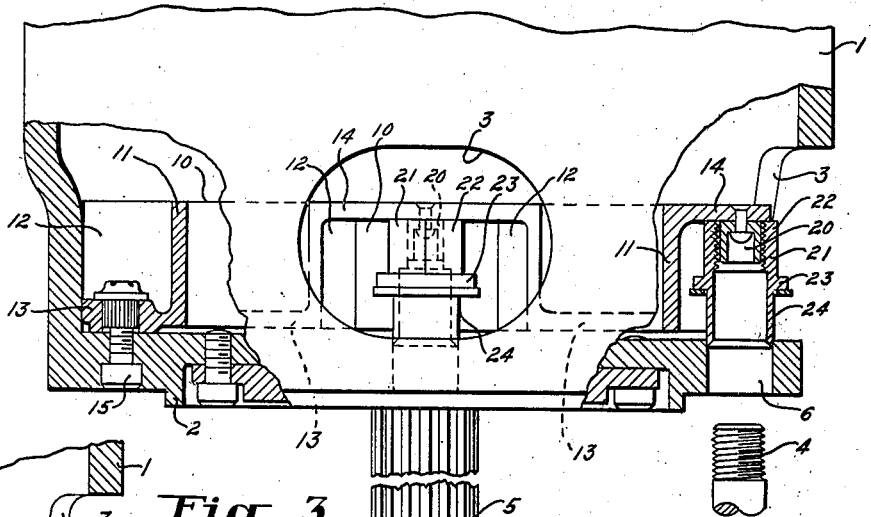
Figure 1 is a fragmentary view, partly in elevation and partly in section, of a generator showing mounting means according to the present invention for engaging stud bolts on an engine.

The invention is illustrated in connection with a generator for aircraft engines, the present generator being without the customary enlarged mounting flange which ordinarily provides fair access for the application of nuts to the stud bolts on the engine. The generator housing is indicated generally by the numeral 1, and has an integral end wall 2 and openings 3 adjacent said end wall. The numeral 4 indicates one of a ring of stud bolts or the like for mounting the housing 1 on an engine with the splined end of the armature shaft 5 in driving engagement with a rotating element on the engine.

The end wall 2 is provided with holes 6 for receiving stud bolts 4, the bolts projecting within the housing 1, each bolt being adjacent an opening 3. In the present embodiment there are six stud bolts 4 and six openings 3 for access thereto. Without the means of the present invention it would be difficult to hold the generator on the stud bolts and start nuts thereon through the restricted openings 3. The present invention provides special nuts and retaining means for holding them in position to receive the stud bolts so that it is a relatively easy matter to start the nuts on the studs.

The above mentioned retaining means are carried by a ring 10 secured to the inner face of end wall 2. Ring 10 comprises a cylindrical portion 11 having radial webs 12 extending outwardly therefrom. Interrupted flanges 13 and 14 bridge the webs 12 on opposite sides thereof in alternate relation, alternate spaces between webs being closed by flanges 13 on one side and intervening spaces being closed by flanges 14 on the other side. Flanges 13 receive bolts 15 to secure the ring 10 to the inner face of end wall 2. Flanges 14 carry cylindrical guides 20 centered above the holes 6.

The numeral 21 designates the special nuts above referred to for engaging studs 4. The nuts 21 have an end portion 22 internally threaded and externally hex-shaped, a central flange 23 and a cylindrical end portion 24 having an enlarged bore and an exterior adapted to turn and slide in the holes 6. The threaded portion of each nut 21 is adapted to turn and slide loosely on its guide 20, and the overall length of the nut is slightly greater than the spacing between flange 14 and end wall 2, the flange 14 serving as a stop to prevent removal of the nut. Thus the nuts may be backed up as shown in Figure 1 to allow studs 4 to pass through holes 6 and enter the enlarged bores in end portions 24. When the housing 1 is brought over the studs 4 the nuts will, in any event, be pushed back as shown in Figure 1, with the male and female threads ready for engagement.

Figure 3:
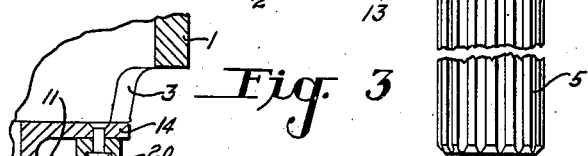
Figure 3 is a fragmentary sectional view showing one of the mounting means tightened on a stud bolt on a supporting structure.
Figure 2:
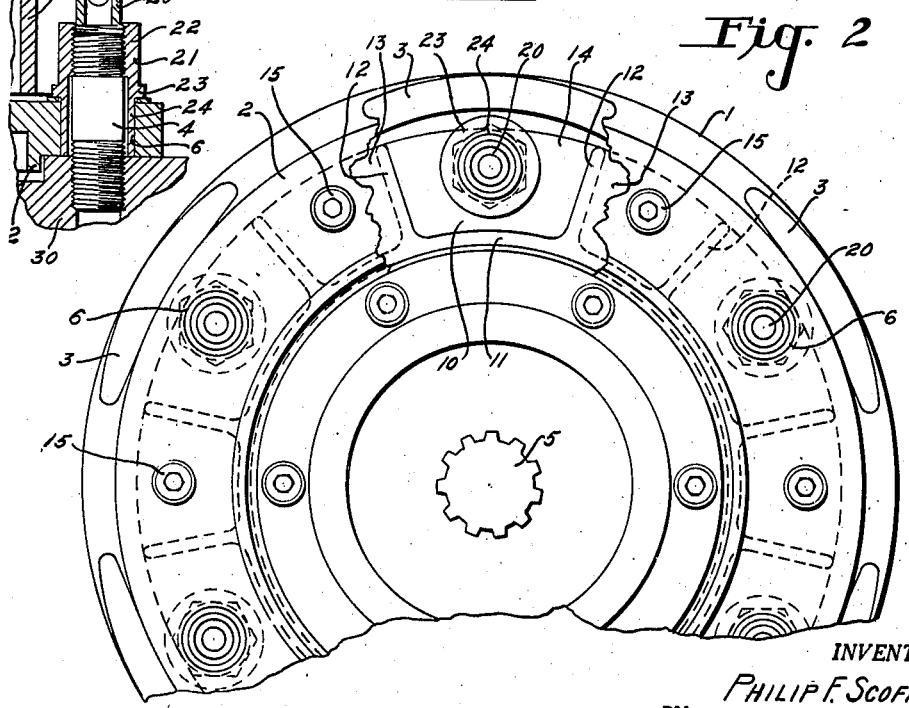
Figure 2 is an end view of the generator with parts broken away.

Access may be had through openings 3 to turn the nuts by hand, and to tighten them with a wrench, no special attention being required to hold the nuts or align them to start them on the studs. Figure 3 shows a nut 21 tightened down on a stud 4 in a supporting member 30 to fasten the housing 1 to the member 30. It will be seen that flange 23 clamps the end wall 2 against the member 30 with the end of the stud spaced from the guide 20. The length of guide 20 is sufficient to retain the nut when the latter is free in its lower position so that the nuts cannot become separated from the housing.

While the housing 1 has been described as a generator housing, it is to be understood that the invention is not limited thereto. This specific embodiment is described merely for the purpose of illustrating the principles of the invention; the invention is to be limited only by the prior art and the scope of the appended claims.

I claim:

1. Securing means for a housing comprising a plurality of openings spaced to receive bolts for supporting said housing, screw threaded nuts having circular portions receiving journaled support in said openings, flanges on said nuts adapted to bear against said housing when said nuts are tightened on said bolts, polygonal portions on said nuts extending beyond said openings, a member secured within said housing, guide means on said member for aligning each of said nuts with one of said bolts, said journaled support and said guide means being jointly operative to maintain said alignment throughout the axial travel of each nut, and openings in said housing adjacent said nuts for access thereto to turn the same.

2. Securing means for a housing comprising a cylindrical opening, a nut having a cylindrical portion journaled in said opening and adapted to loosely receive a supporting bolt, an internally threaded polygonal portion on said nut for engaging said bolt, a flange between said two portions for seating against said housing when said nut is tightened, a fixed cylindrical guide extending within said threaded portion, and a stop associated with said guide to prevent removal of said nut from said opening.

3. Securing means for a cylindrical housing comprising a ring of circular openings in an end wall of said housing, a cylindrical ring, radial webs extending outwardly from said ring, two sets of interrupted flange elements connecting pairs of said webs in alternate relation on opposite sides of said ring, one set of said flange elements being attached to the inside of said end wall at spaced points intermediate said openings, the other set of flange elements carrying cylindrical guide elements aligned with said openings, and screw threaded nuts carried by said openings and said guide elements for limited axial movement and unlimited rotational movement.

PHILIP F. SCOFIELD.